Nov. 15, 1938.       W. E. WOODARD       2,136,405
VALVE MOTION MECHANISM
Filed Jan. 10, 1936       6 Sheets-Sheet 1

INVENTOR
William E. Woodard
BY
Symmestvedt & Lechner
ATTORNEYS

Nov. 15, 1938.    W. E. WOODARD    2,136,405
VALVE MOTION MECHANISM
Filed Jan. 10, 1936    6 Sheets-Sheet 2

INVENTOR
William E. Woodard
BY
Symmestvedt + Lechner
ATTORNEYS

Nov. 15, 1938.  W. E. WOODARD  2,136,405
VALVE MOTION MECHANISM
Filed Jan. 10, 1936  6 Sheets-Sheet 6

INVENTOR
William E. Woodard
BY
Lynnestvedt & Lechner
ATTORNEYS

Patented Nov. 15, 1938

2,136,405

UNITED STATES PATENT OFFICE 2,136,405

VALVE MOTION MECHANISM

William E. Woodard, Forest Hills, N. Y.

Application January 10, 1936, Serial No. 58,504

33 Claims. (Cl. 121—116)

This invention relates to valve motion mechanism, and particularly to valve gears applicable to steam engines, especially of the double-acting two-cylinder reversible type and in which variable cut-off is desired as well as other valve events corresponding with variable cut-off.

The invention is particularly applicable to and useful in locomotives, and it may be employed in association with slide, rotary, piston or poppet valves. The invention has, however, especial advantages when used in association with poppet valves and I prefer to employ it in conjunction with poppet valve arrangements for various reasons, among which it might be stated: that the forces required to actuate the cam mechanism of a poppet valve engine are ordinarily materially less than the forces required to operate slide or piston valves, for example, so that the parts of the valve motion can be made correspondingly smaller and/or lighter; and further that the poppet type of valve cooperates well with my present improvements in effecting a more nearly constant or uniform valve opening throughout the period of steam admission.

In view of the foregoing, the invention will be described and illustrated herein as applied to a poppet valve equipped locomotive.

My improved valve motion falls within the general field of valve gears in which the mechanism is actuated by the crossheads which are secured, respectively, to the piston rods of the two cylinders, one on each side of the locomotive engine. It will be understood, of course, that the actuating connection is not limited necessarily to the crosshead itself as the motion can be taken from any portion of those parts of the engine which reciprocate in unison with the pistons. Before considering this general type of valve gear and before taking up particularly my improvements in that field, it will be helpful to an understanding of the present invention and its advantages to consider, first, the present general type of valve motions which are in widespread regular use.

Most of the valve gears now in use are driven primarily from an eccentric crank on the main crank pin of the locomotive, with an actuating connection also from the crosshead to control lap and lead. The eccentric crank is connected to the remainder of the valve motion by an eccentric rod. The weight, at the main crank pin, of the eccentric crank and a certain proportion of the eccentric rod coupled thereto, often amounts to as much as 200 to 250 lbs. at each side of the locomotive. This is of particular disadvantage in the large heavy motive power which has now come into use on the railways, in which it is extremely difficult to obtain the proper counterweight in the main driving wheels to counterbalance the weight of the driving rods and pins, let alone the weight of the eccentric cranks and their associated parts. Moreover the eccentric crank and rod used with the ordinary valve motion are placed at the extreme outer end of the main crank pin and, therefore, the effect of its rotating and reciprocating action is magnified by the distance of its plane of action from the plane of action of the counterweight.

Another disadvantage of present standard practice is that whenever it becomes necessary to remove the driving rods from the main crank pins, the eccentric crank must be removed before the rods can be taken down and, of course, when the parts are reassembled the eccentric crank must be accurately replaced after the rods are in position. As a practical result it has been found troublesome to obtain accurate reassembly and difficult to maintain the eccentric crank tight upon the crank pin so that its position thereon will not be shifted.

A further problem incident to the usual constructions arises from the fact that a valve actuating connection to the driving wheels involves, and must accommodate, the relative motion between the wheels and the spring-supported superstructure on which the remainder of the valve motion is fixed.

In sharp contrast with the foregoing ordinary practice is the general type of valve motion mechanism which is driven from the crossheads alone. This general type has the latent possibility of overcoming the various disadvantages of the valve gears commonly in use. In view of such substantial advantages, it would have been of great benefit to have been able to employ valve motions driven only from the crossheads, but due to other complications and disadvantages, such motions have been impractical or at least have not come into general use. Their possible advantages have long been recognized, but they have had certain mechanical difficulties which have not heretofore been overcome.

My invention, therefore, fundamentally involves the construction of a practical form of valve motion of the latter general type, which overcomes the disabilities inherent in valve motions of this type as heretofore attempted.

In general, the present invention contemplates, in a valve motion of the crosshead-actuated type: a substantial reduction in the size and weight of the valve gear; simplification thereof;

reduction in cost and maintenance; and ready removability of the main valve motion mechanism as a unit, for instance for purposes of repair, or for complete replacement of the unit.

Still further and more detailed objects and advantages are: the combining of the movements of the two crossheads by a mechanism which forms a single compact unit; the location of said mechanism centrally of the locomotive (between the axes of the two cylinders); the mounting of said mechanism in a small, rigid, oil-tight and dirt-excluding casing or housing which serves as the frame of the valve gear, is mounted preferably on the main frame of the locomotive, and which is readily removable with its contained mechanism as a unit; the reduction in the number of operating connections passing from the outside to the inside of said casing or valve motion box; the making of all necessary connections through the medium of rotative or rock shafts passing through the walls of the casing and mounted therein by means of positively positioned antifriction bearings; the making of the external connections to said shafts by means of readily disconnectible couplings; the mounting of corresponding shafts, oscillating members, links, etc., for the two sides of the mechanism, on coinciding or coaxial centers; the placing of the two links in relatively close side-by-side juxtaposition; the actuation of the links in a relatively reversed manner so that both link blocks may be operated in unison from one tumbling shaft; the actuation of the link for each side of the engine respectively from the crosshead on the opposite side, by the employment of diagonally crossing transmission rods, the actuation or driving of said transmission rods each respectively by an oscillating member or transmission lever coupled to a crosshead, one of which rods is coupled to its driving member above the center of oscillation thereof and the other to its driving member below the latter's center of oscillation; and the mounting of a combining lever, for each side, upon the oscillating transmission lever, said combining lever being coupled to its link block by means of a radius rod and to the valve or valves on the same side of the engine through a valve actuating rockshaft.

More specifically, as to structure, the movement of one cross-head (or other reciprocating part moving in unison with the piston) is transmitted to an oscillating member which is located in juxtaposition to and on a coinciding axis of rotation with a similar oscillating member driven from the opposite crosshead. It is preferable, in order to obtain some of the other advantages of the invention, to locate these two main or primary oscillating members about midway (laterally) between the cylinder axes although in its broader aspects the invention is not limited to this particular location.

The invention further contemplates that the combining lever coupled to the valve means on one side of the locomotive shall be associated with, preferably by being pivoted directly upon, the oscillating member which is driven by the crosshead on that side. The radius rod, which is coupled to said combining lever and movably associated as by a link block with the oscillating link for said side, receives its motion from the crosshead on the opposite side of the locomotive, by virtue of a diagonal cross connection pivotally coupled to said link and to the corresponding primary oscillating member on said opposite side.

A substantially similar hook-up is preferably employed to actuate the valve means on the opposite side of the locomotive, but in order that the means on the two sides should operate in proper timed relation with the movements of the pistons in their respective cylinders, with the link blocks in identical relative positions in the two links, the diagonally crossing connections which drive the links must produce a relatively reversed operation of the two links, which may conveniently be accomplished by coupling one of said diagonal cross connections to the upper arm of its oscillating driving member and the other of said connections to the lower arm of its oscillating driving member. With such an arrangement, the link blocks may both be placed in a lowered position in their respective links, for one direction of motion of the vehicle, and in a raised position for the opposite direction of motion, thus avoiding the necessity of having two separate reach rods or otherwise relatively inverting the movements of the link blocks.

How the foregoing objects and advantages, together with such others as may occur to those skilled in the art or as may be incident to the invention, are obtained, will appear more clearly from the following description, taken together with the accompanying drawings, in which—

Figure 1:
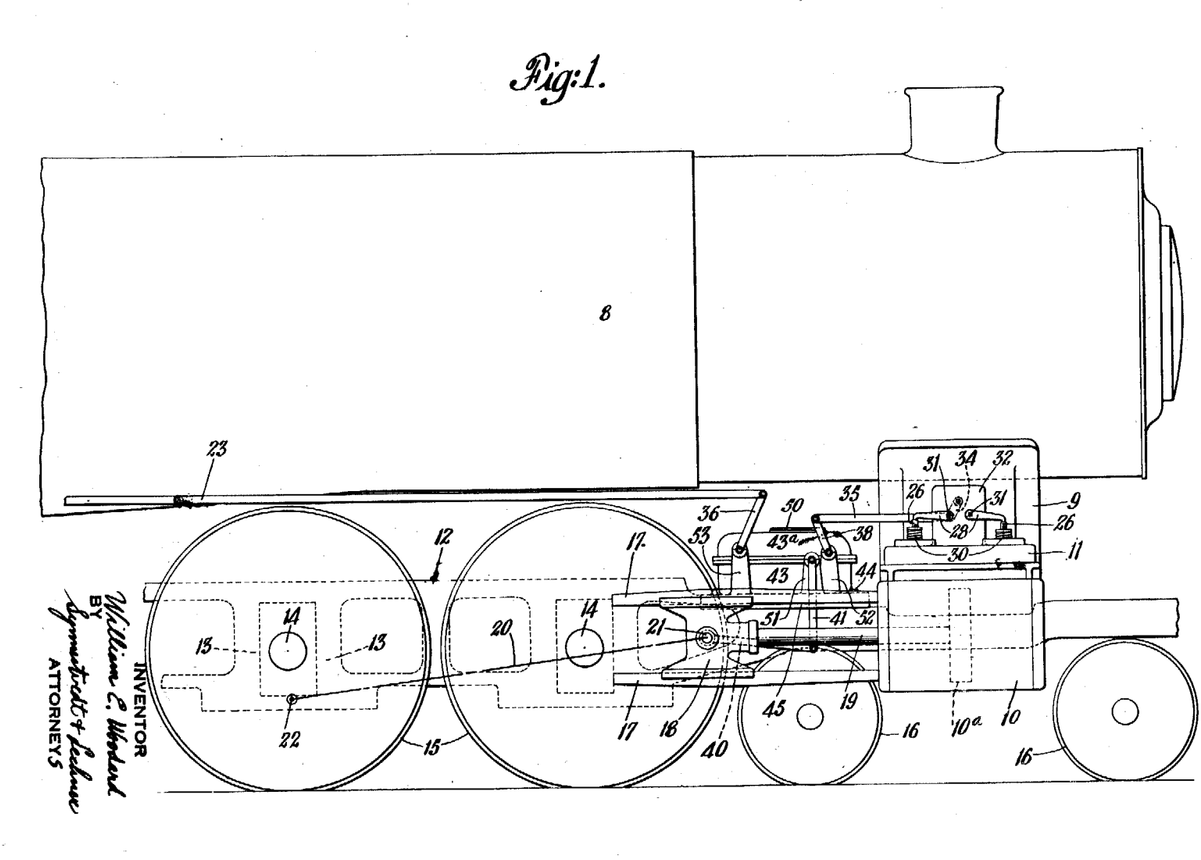
Figure 1 is a fragmentary, and somewhat diagrammatic, side elevational view of a locomotive, illustrating the application of my improved valve motion mechanism thereto.
Figure 2:
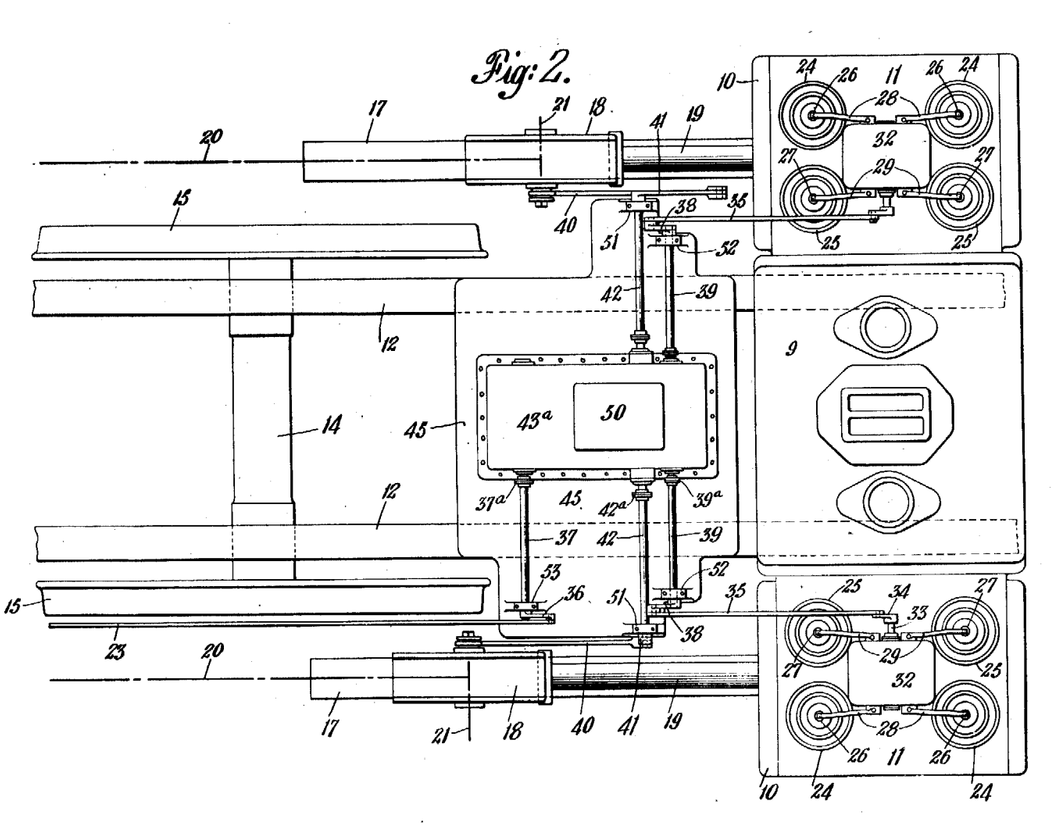
Figure 2 is a plan view, on a larger scale, of the forward portion of the locomotive chassis, and illustrating in top plan the arrangement of the present invention.

By reference to Figures 1 and 2, it will be seen that the locomotive to which the invention has here been shown as applied may be of ordinary general construction, comprising a boiler 8, cylinder saddle 9, cylinders and valve chests 10, 11, main frame comprising longitudinal side members 12 having pedestal jaws 13 in which the axles 14 of the driving wheels 15 are mounted as by ordinary driving boxes (not shown) for vertical and possibly also lateral motion, pilot truck wheels 16, crossed guides 17, in each pair of which is slidably mounted the crosshead 18 actuated by piston rod 19, and main driving rods diagrammatically indicated at 20, which are pivotally connected to their respective crossheads as at 21 and coupled to their main crank pins, the center of one of which is indicated at 22. It may here be noted that Fig. 2 omits the boiler, the upper crosshead guide members, and other parts, for clarity of illustration.

The locomotive here shown is also equipped with a valve gear reach rod 23, which is connected to the improved valve motion of the present invention by pivotal connection to a lever 36 fixed on rockshaft 37 and other parts hereinafter to be described.

As before indicated, the form of valves employed in the present embodiment is of the vertically-moving poppet type. In each valve chest there are two steam admission valves indicated at 24 and two exhaust valves indicated at 25, the internal structure of which need not be illustrated as it may take a form similar to that shown, for example, on page 621 of the Locomotive Cyclopedia for 1930. The valve stems 26 and 27 are, however, indicated.

These valves are, respectively, opened by downward swinging movement of the external arms 28 and 29, which act against the force of springs 30 as well as against the partially unbalanced steam pressure. The valve actuating arms are fixed upon rocker shafts (indicated at 31 in Figure 1) which pass into the cam box 32 where they in turn are actuated by cam followers and a cam, there being separate admission and exhaust cams both mounted upon the cam shaft 33 which is oscillated or rocked by the external lever 34 pivotally connected to the longitudinal link 35 which is coupled into the valve motion by pivotal connection to a lever 38 fixed on rockshaft 39 and other parts later described.

The sole driving or actuating connection for the valve operation is by the crosshead links 40, each pivoted to a crosshead and to the lower end of an arm 41 fixed on rockshaft 42 which is connected into the valve motion box as hereinafter described.

The valve motion box 43, which houses the valve motion mechanism proper and serves as a frame for the parts thereof, is of small size and readily fits in the space just back of the cylinder saddle, below the boiler or smoke-box and just above the main frame. It may be removably mounted, as by the securing flanging 44, upon the bed plate 45, and/or the bed plate may be removably mounted on the main frame members 12. The casing of this box may be made separable, preferably by dividing the same on a horizontal plane, the upper portion 43a being secured to the lower part by flanges 46, 47 and bolts 48, and the said upper or lid part may conveniently have an inspection hole 49, closed by a cover plate 50.

In addition to serving as a base for the valve-gear box, the base plate 45 mounts two pairs of brackets 51, 52, serving to support journals or bearings for the rockshafts 42 and 39, respectively, and a bracket 53 to journal the shaft 37. Readily disconnectible (and, if necessary, flexible), couplings 37a, 42a and 39a are provided to connect the external rockshafts to the respective internal shafts 37b, 42b and 39b.

Figure 3:
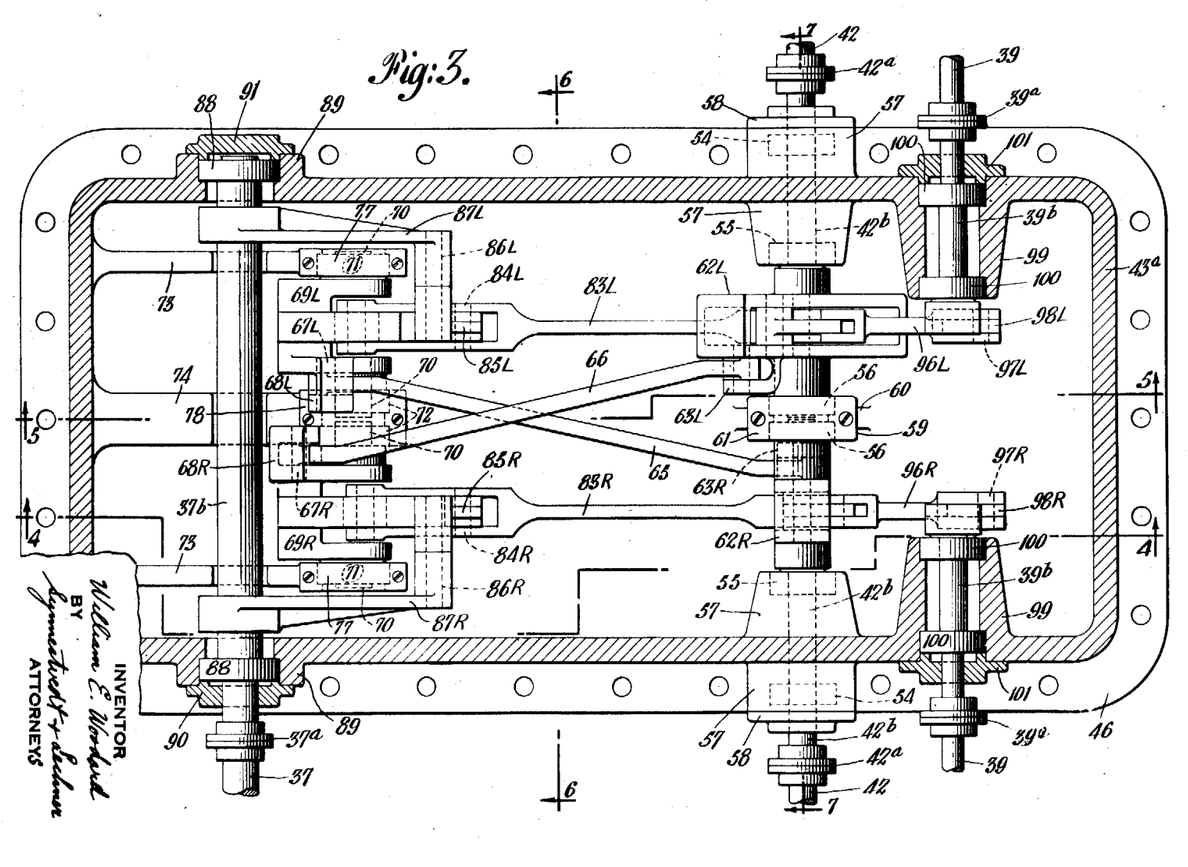
Figure 3 is a horizontal sectional view, on a still larger scale, through the valve gear box or casing, taken about on the line 3—3 of Figure 4, and illustrating the working parts of the mechanism in top plan.
Figure 4:
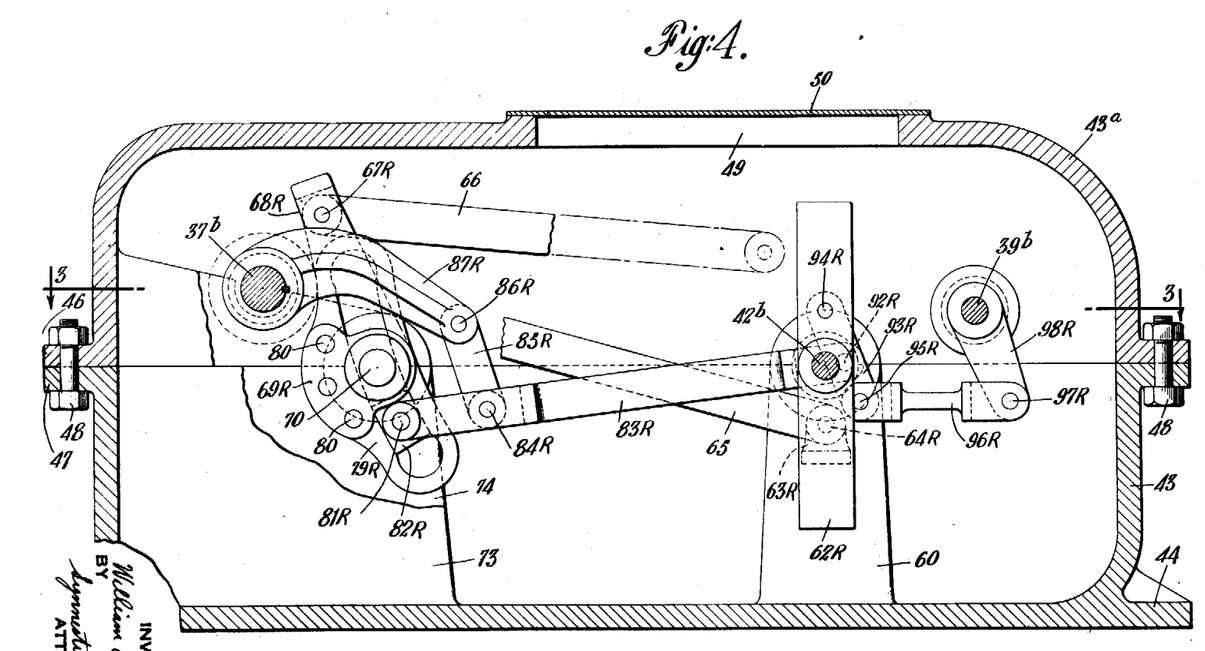
Figure 4 is a vertical longitudinal section taken about the line 4—4 of Figure 3.
Figure 5:
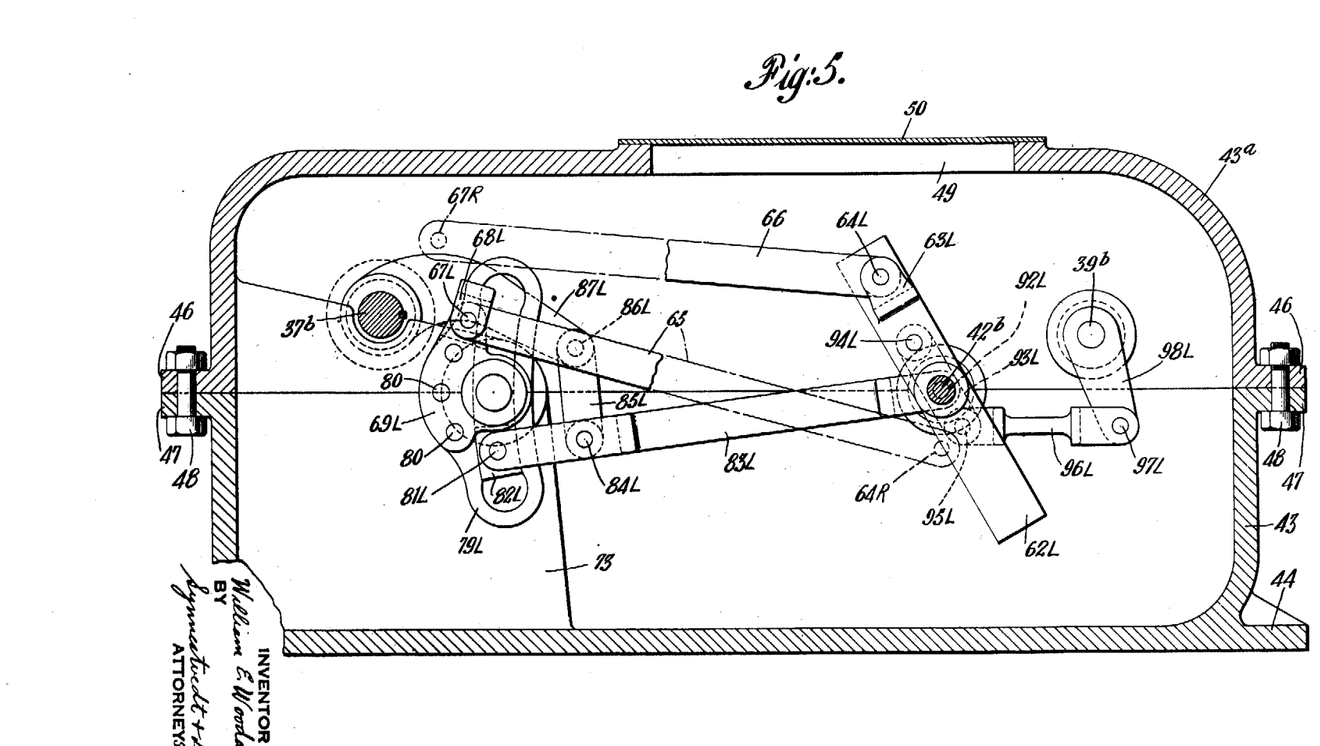
Figure 5 is a similar section taken about on the line 5—5 of Figure 3.
Figure 6:
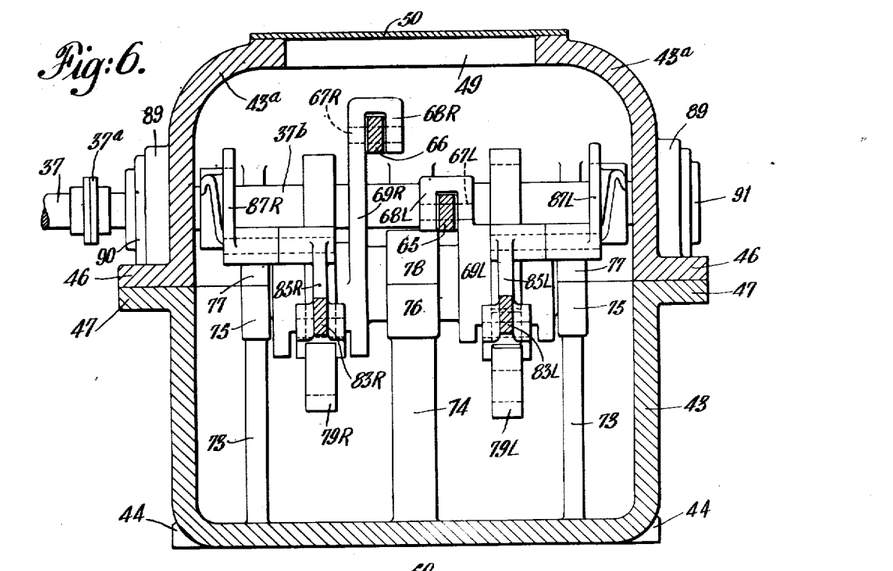
Figure 6 is a transverse section on the line 6—6 of Figure 3.
Figure 7:
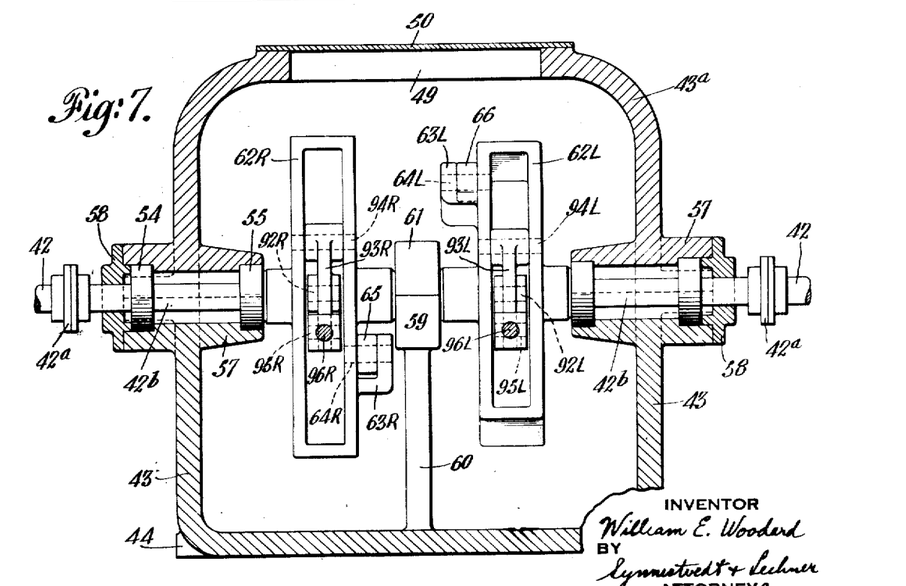
Figure 7 is a transverse section on the line 7—7 of Figure 3.

Considering now the internal or main valve motion mechanism, as seen in Figs. 3 to 7, it will be observed that the right and left driving shafts 42b, which are co-axial, are supported each by three bearings, 54, 55 and 56 (see Figures 3 and 7). These bearings are preferably of a rolling anti-friction type, such as ball bearings (the races of which are indicated), those numbered 54 and 55 being mounted in a tubular boss 57 formed in the side wall of the box, the lower half of this tubular support being integral with the lower part 43 of the box, and the upper half being integral with the upper part 43a, since the split in the box or casing comes at the same horizontal plane as the axis of the shafts 42b (as seen in Figure 5). The outer end of the bearing support is closed by an annular cap member 58, which also serves as a bearing retainer. The two bearings 56, one for each shaft 42b, are mounted side by side (as seen in Figure 3) in a bearing pillow 59 supported on an internal bracket 60, a pillow block 61 being secured over the top of these two bearings to hold them in place.

The right and left side primary oscillating members or yokes 62R, 62L, which actuate the remainder of the valve motion mechanism, are fixed respectively upon the right and left shafts 42b which are actuated from the crossheads. Below its center of oscillation, the member 62R carries a pin-supporting bracket 63R, and above its center of oscillation the member 62L carries a pin-supporting bracket 63L; and on the pivot pins 64R, 64L are respectively mounted the forward ends of the diagonally crossed link-driving rods 65 and 66.

The rear ends of rods 66 and 65 are respectively pivoted by pins 67R, 67L in the pin-supporting brackets 68R, 68L, formed respectively on the right and left-hand oscillating link yokes 69R, 69L. Each of these yokes has a pair of trunnions 70, mounted in outer and inner ball bearings 71, 72, there being for each bearing 71 a support in the form of an upstanding web or bracket 73, and for the two side-by-side bearings 72 a support in the form of a central web or bracket 74, pillows and pillow blocks 75, 76, 77 and 78 being provided (as seen in Figure 6).

The link yokes 69R, 69L are each made in two pieces which are clamped together upon each side of the respective link 79R or 79L, as by bolts 80. Thus the motion of the transmission or driving rods 66 and 65 acts to oscillate the respective links 79R, 79L.

Pivoted by pins 81R, 81L upon the link blocks 82R, 82L are the radius rods 83R, 83L, in the fork ends of which are pivoted at 84R, 84L the respective lifting links 85R, 85L, these lifting links being pivotally coupled at 86R, 86L, respectively, to the right and left-hand arms 87R, 87L which are keyed on the tumbling shaft 37b, which latter, as hereinbefore described, is coupled with the reverse gear. At this point it might be observed that the mounting of the tumbling shaft is by ball bearings 88 secured in tubular bosses 89 in the casing member 43a, the openings being covered by bearing retaining caps 90, 91.

The forward ends of the radius rods are coupled by pins 92R, 92L, respectively, on the right-hand and left-hand combining levers 93R, 93L, these levers being mounted at their upper ends, respectively, upon the primary oscillating transmission members or yokes 62R, 62L by pivot pins 94R, 94L. The lower ends of the combining levers are pivotally coupled at 95R, 95L to links 96R, 96L extending forwardly, and pivotally connected at 97R, 97L, respectively, to the lower end of arms 98R, 98L which are fixed respectively upon the right and left-hand valve actuating rockshafts 39b. Shafts 39b are mounted by means of tubular bosses 99, bearings 100, and closure caps 101. The mechanism as above described operates upon the following principle: the movement of the crosshead on the right side of the locomotive is utilized to drive the linkage motion for the left side, the movement of the crosshead on the left side being combined with the movement derived from said left-hand linkage motion to control the valve means on that side. Similarly, the movement of the crosshead on the left side of the locomotive is utilized to drive the linkage motion for the right side, the movement of the crosshead on the right side being combined with the movement derived from said right-hand linkage motion to control the valve means on said right side.

The timing of the valves, in accordance with the above stated principle of operation, is determined by a combination of the following motions (considering now the valves on one side): first, a motion of uniform amplitude and bearing a constant relation, as to direction, relative to the motion of the corresponding piston, which motion is derived from the oscillating member on that side; and, second, a motion which is capable of being varied in amplitude and of being reversed in direction, which is derived from the link driven by the oscillating member on the opposite side. For the latest cut-off desired the link block is placed in its extreme position in the link, thus imparting to the radius rod and thence to the combining lever (from which the valves are driven) the maximum amount of motion which the link provides. This motion, in combination (by means of the combining lever) with the motion of the oscillating member produces the requisite timing of the valves for the latest cut-off desired. As the link block is moved toward the center of the link, a smaller and smaller motion of the link is imparted to the radius rod and thence to the combining lever, the motion of the oscillating member remaining always the same, with the result that the timing of the valves is progressively such as to give an earlier cut-off. When the link block is moved to the central position, there is no motion imparted by the link to its radius rod and combining lever and the timing of the valves is then determined entirely by the motion of the oscillating member driven by the crosshead on the particular side. This is the mid-gear position of the valve motion and corresponds with the earliest cut-off, which cut-off is exactly equal to the preadmission. As the link block is moved toward the opposite end of the link the procedure is reversed, the cut-off being progressively lengthened, the resultant position and timing of the valves with relation to the steam portage at the two ends of the cylinder producing a reversal of the engine.

From the drawings in general, it will be observed that the mechanism is illustrated in full-gear position for forward operation of the locomotive. The reach rod 23 and reversing arm 36 are in their forward position, so that, through the intermediation of the tumbling shaft 37b, lifting arms 87R and 87L and lifting links 85R and 85L, the radius rods 83R and 83L with their link blocks 82R and 82L are in their lowermost position, i. e. the link blocks are at the bottom of the links, so as to give maximum cut-off. The rest of the valve motion mechanism is shown in the position corresponding to forward-motion full-gear, with the right-hand piston 10a at half stroke (the right-hand crank pin 22 being at the bottom position) and the left-hand piston and crank at forward dead center.

The valves and portage, and the valve operating cams may, of course, be so proportioned, in accordance with known standard practice, that with the motion mechanism in the full-gear position shown, the steam admission will continue through only a limited percentage of the piston stroke, for instance the locomotive may be designed to have a maximum cut-off, for example, at 60%, 50% or 40% of the stroke, etc. However, the structure and operation of the valves and valve cams need not herein be shown, as those parts of the locomotive do not constitute a part of the present invention, and, as before stated, various other known types of valves may be used with my improved valve motion mechanism.

From the foregoing description it will be evident that the valve motion proper is compactly housed as a single unit, that the transmission of motion from the crossheads to the valve gear is made by means of a single pair of shafts, one passing into the box from each side, and similarly that the take-off of the valve motion and delivery thereof to the valves is made by a single pair of shafts, that these four shafts and the tumbling shaft (all of which are of an oscillative nature) constitute the sole connections passing through the valve gear case, that corresponding parts for the two sides are mounted on coaxial centers and are firmly supported in permanent alignment on readily accessible but protected anti-friction bearings, that complicated and cumbersome valve motion parts and supports therefor are eliminated, that bent or cranked cross-shafts (characteristic of many previous crosshead-driven valve gears) are entirely absent, and that in general the various objects and advantages set out in the fore part of this specification are attained by a mechanism which is relatively simple, compact, sturdy, and of low initial and maintenance cost.

I claim:

1. In a locomotive valve gear of the type in which the valve movements are derived solely from the reciprocating parts of the engine and in which swinging links or quadrants are employed, a member mounted to oscillate in unison with the piston on one side and having a cross connection for driving that link which is located on the opposite side, and a lever pivotally mounted on the oscillating member for combining the motion of said member with the motion of a link actuated in unison with the piston on the opposite side.

2. In a locomotive valve gear of the type in which the valve movements are derived solely from the reciprocating parts of the engine and in which swinging links and associated radius rods are employed, a member mounted to oscillate in unison with the piston on one side and having a cross connection for driving that link which is located on the opposite side, and a lever pivotally mounted on the oscillating member for combining the motion of its oscillating member with the motion of the radius rod of a link actuated in unison with the piston on the opposite side.

3. For a locomotive engine having a piston and associated reciprocating parts at each side of the engine, a valve gear actuated by the reciprocating parts and comprising: a member mounted to oscillate in unison with the piston on one side, a member mounted to oscillate in unison with the piston on the other side, for each side a link with its associated link block and radius rod, the first mentioned oscillating member having means for driving the link on the opposite side in like sense with its own oscillation, and the second mentioned oscillating member having means for driving the link on the first mentioned side in a reversed direction of oscillation, whereby the link blocks are in the same position in the two links, respectively, for any given setting of the valve motion.

4. For a locomotive engine having a pair of pistons and associated reciprocating parts, a valve gear actuated by said reciprocating parts and comprising a member oscillating in unison with one piston and a link lying in substantially the same vertical plane as said oscillating member, a similar oscillating member driven by the piston on the opposite side and a link lying in substantially the same vertical plane as the last mentioned oscillating member, the plane of motion of the oscillating member and link on one side being laterally adjacent to the plane of motion of said parts on the other side, and driving connections between the respective oscillating members and the respectively opposite links, whereby said connections lie in large part in an intermediate zone between said two planes.

5. For a locomotive engine having a pair of pistons and associated reciprocating parts, a valve gear actuated by said reciprocating parts and comprising a member oscillating in unison with one piston and a link lying in substantially the same vertical plane as said oscillating member, a similar oscillating member driven by the piston on the opposite side and a link lying in substantially the same vertical plane as the last mentioned oscillating member, the plane of motion of the oscillating member and link on one side being laterally adjacent to the plane of motion of said parts on the other side, and driving connections between the respective oscillating members and the respectively opposite links, whereby said connections lie in large part in an intermediate zone between said two planes, and a common enclosure for said valve gear parts.

6. For a locomotive engine having a pair of pistons and associated reciprocating parts, a valve gear actuated by said reciprocating parts and comprising a member oscillating in unison with one piston and a link lying in substantially the same vertical plane as said oscillating member, a similar oscillating member driven by the piston on the opposite side and a link lying in substantially the same vertical plane as the last mentioned oscillating member, the plane of motion of the oscillating member and link on one side being laterally adjacent to the plane of motion of said parts on the other side, and driving connections between the respective oscillating members and the respectively opposite links, whereby said connections lie in large part in an intermediate zone between said two planes, and an oil-tight casing for said valve gear parts, with actuating connections in the form of rockshafts extending through the casing walls.

7. For a locomotive engine having a pair of pistons and associated reciprocating parts, a valve gear actuated by said reciprocating parts and comprising a member oscillating in unison with one piston and a link lying in substantially the same vertical plane as said oscillating member, a similar oscillating member driven by the piston on the opposite side and a link lying in substantially the same vertical plane as the last mentioned oscillating member, the plane of motion of the oscillating member and link on one side being laterally adjacent to the plane of motion of said parts on the other side, and driving connections between the respective oscillating members and the respectively opposite links, whereby said connections lie in large part in an intermediate zone between said two planes, and an oil-tight casing for said valve gear parts, with actuating connections in the form of rockshafts extending through the casing walls, together with bearings for the rockshafts mounted in permanent alignment in said casing and lubricated in common with said valve gear parts.

8. In a locomotive having a cylinder, valve chest, piston and associated reciprocating parts on each side thereof supported by the main frame, a valve gear comprising a casing with the valve motion parts housed therein and mounted on the main frame intermediate the planes of said cylinders, and driving connections from said reciprocating parts to said valve motion parts and from the latter parts to the valves, all of said connections being coupled to the valve motion parts inside the box by means of rockshafts extending through the walls of the box, whereby the entire valve motion is unaffected by relative motion between the main frame and the wheels and the valve motion parts are sealed as against dirt and the like.

9. In a reversible locomotive engine or the like having a pair of double-acting cylinders with their pistons and other reciprocating parts actuating cranks set at relatively different angular positions and steam-controlling valve means for each of said cylinders, a valve motion mechanism, adapted to combine the movements of both said pistons for actuating said valve means, comprising: a movably mounted member connected with a reciprocating part driven by one of said pistons for oscillation in synchronism with said piston, a movably mounted member connected with a reciprocating part driven by the second piston for oscillation in synchronism therewith, a pair of links pivotally mounted on centers removed from the pivotal centers of said oscillating members but respectively connected with said members for oscillation thereby, a pair of combining levers pivotally associated respectively with said oscillating members, each of said levers being connected respectively to operate the valve means associated with that cylinder whose piston is driving the respective oscillating member on which said lever is mounted, and a pair of radius rods adjustably coupled respectively with said links, the radius rod which receives motion from the link driven in synchronism with the first piston being operatively connected to the combining lever associated with the oscillating member driven by the second piston, and the other radius rod which receives motion from the link driven in synchronism with the second piston being operatively connected to the combining lever associated with the oscillating member driven by the first piston.

10. In a reversible locomotive engine or the like having a pair of double-acting cylinders with their pistons and other reciprocating parts actuating cranks set at relatively different angular positions and steam-controlling valve means for each of said cylinders, a valve motion mechanism, adapted to combine the movements of both said pistons for actuating said valve means, comprising: a movably mounted member connected with a reciprocating part driven by one of said pistons for oscillation in synchronism with said piston, a movably mounted member connected with a reciprocating part driven by the second piston for oscillation in synchronism therewith, said two oscillating members being positioned on axially-aligned centers, a pair of links pivotally mounted on centers removed from the pivotal centers of said oscillating members but respectively connected with said members for oscillation thereby, a pair of combining levers pivotally associated respectively with said oscillating members, each of said levers being connected respectively to operate the valve means associated with that cylinder whose piston is driving the respective oscillating member on which said lever is mounted, and a pair of radius rods adjustably coupled respectively with said links, the radius rod which receives motion from the link driven in synchronism with the first piston being operatively connected to the combining lever associated with the oscillating member driven by the second piston, and the other radius rod which receives motion from the link driven in synchronism with the second piston being operatively connected to the combining lever associated with the oscillating member driven by the first piston.

11. In a reversible locomotive engine or the like having a pair of double-acting cylinders with their pistons and other reciprocating parts actuating cranks set at relatively different angular positions and steam-controlling valve means for each of said cylinders, a valve motion mechanism, adapted to combine the movements of both said pistons for actuating said valve means, comprising: a movably mounted member connected with a reciprocating part driven by one of said pistons for oscillation in synchronism with said piston, a movably mounted member connected with a reciprocating part driven by the second piston for oscillation in synchronism therewith, a pair of links respectively connected with said member for oscillation thereby one in unison with its driving oscillating member and the other in opposition to the motion of its driving oscillating member, a pair of combining levers pivotally mounted respectively on said oscillating members, each of said levers being connected respectively to operate the valve means associated with that cylinder whose piston is driving the respective oscillating member on which said lever is mounted, and a pair of radius rods adjustably coupled respectively with said links, the radius rod which receives motion from the link driven in synchronism with the first piston being operatively connected to the combining lever associated with the oscillating member driven by the second piston, and the other radius rod which receives motion from the link driven in synchronism with the second piston being operatively connected to the combining lever associated with the oscillating member driven by the first piston.

12. In a reversible locomotive engine or the like having a pair of double-acting cylinders with their pistons and other reciprocating parts actuating cranks set at relatively different angular positions and steam-controlling valve means for each of said cylinders, a valve motion mechanism, adapted to combine the movements of both said pistons for actuating said valve means, comprising: a movably mounted member connected with a reciprocating part driven by one of said pistons for oscillation in synchronism with said piston, a movably mounted member connected with a reciprocating part driven by the second piston for oscillation in synchronism therewith, a pair of links respectively connected with said members for oscillation thereby one in unison with its driving oscillating member and the other in opposition to the motion of its driving oscillating member, a pair of combining levers pivotally mounted respectively on said oscillating members, each of said levers being connected respectively to operate the valve means associated with that cylinder whose piston is driving the respective oscillating member on which said lever is mounted, and a pair of radius rods adjustably coupled respectively with said links, the radius rod which receives motion from the link driven in synchronism with the first piston being operatively connected to the combining lever associated with the oscillating member driven by the second piston, and the other radius rod which receives motion from the link driven in synchronism with the second piston being operatively connected to the combining lever associated with the oscillating member driven by the first piston, and reversing mechanism so connected with said radius rods as to move them simultaneously to the upper ends or simultaneously to the lower ends of their associated links for the two directions of motion of the locomotive engine.

13. In a reversible locomotive engine or the like having a pair of double-acting cylinders with their pistons and other reciprocating parts actuating cranks set at relatively different angular positions and steam-controlling valve means for each of said cylinders, a valve motion mechanism, adapted to combine the movements of both said pistons for actuating said valve means, comprising: a movably mounted member connected with a reciprocating part driven by one of said pistons for oscillation in synchronism with said piston, a movably mounted member connected with a reciprocating part driven by the second piston for oscillation in synchronism therewith, said two oscillating members being positioned side-by-side on axially-aligned centers of oscillation, a pair of links pivotally mounted on centers removed from the pivotal centers of said oscillating members but respectively connected with said members for oscillation thereby and positioned in side-by-side relation on axially-aligned centers of oscillation, a pair of combining levers pivotally mounted respectively on said oscillating members, each of said levers being connected respectively to operate the valve means associated with that cylinder whose piston is driving the respective oscillating member on which said lever is mounted, and a pair of radius rods adjustably coupled respectively with said links, the radius rod which receives motion from the link driven in synchronism with the first piston being operatively connected to the combining lever associated with the oscillating member driven by the second piston, and the other radius rod which receives motion from the link driven in synchronism with the second piston being operatively connected to the combining lever associated with the oscillating member driven by the first piston.

14. In a reversible locomotive engine or the like having a pair of double-acting cylinders with their pistons and other reciprocating parts actuating cranks set at relatively different angular positions and steam-controlling valve means for each of said cylinders, a valve motion mechanism, adapted to combine the movements of both said pistons for actuating said valve means, comprising: a movably mounted member connected with a reciprocating part driven by one of said pistons for oscillation in synchronism with said piston, a movably mounted member connected with a reciprocating part driven by the second piston for oscillation in synchronism therewith, said two oscillating members being positioned side-by-side on axially-aligned centers of oscillation, a pair of links respectively connected with said members for oscillation thereby and positioned in side-by-side relation on axially-aligned centers of oscillation, each link lying substantially in a common vertical plane with one of the oscillating members but the driving connections being crossed so that the oscillating member on one side drives the link on the opposite side and the oscillating member on said opposite side drives the link on the first mentioned side, a pair of combining levers pivotally mounted respectively on said oscillating members, each of said levers being connected respectively to operate the valve means associated with that cylinder whose piston is driving the respective oscillating member on which said lever is mounted, and a pair of radius rods adjustably coupled respectively with said links, the radius rod which receives motion from the link driven in synchronism with the first piston being operatively connected to the combining lever associated with the oscillating member driven by the second piston, and the other radius rod which receives motion from the link driven in synchronism with the second piston being operatively connected to the combining lever associated with the oscillating member driven by the first piston.

15. In a reversible locomotive engine or the like having a pair of double-acting cylinders with their pistons and other reciprocating parts actuating cranks set at relatively different angular positions and steam-controlling valve means for each of said cylinders, a valve motion mechanism, adapted to combine the movements of both said pistons for actuating said valve means, comprising: a movably mounted member connected with a reciprocating part driven by one of said pistons for oscillation in synchronism with said piston, a movably mounted member connected with a reciprocating part driven by the second piston for oscillation in synchronism therewith, a pair of links respectively connected with said members for oscillation thereby, a pair of combining levers pivotally mounted respectively on said oscillating members, each of said levers being connected respectively to operate the valve means associated with that cylinder whose piston is driving the respective oscillating member on which said lever is mounted, and a pair of radius rods adjustably coupled respectively with said links, the radius rod which receives motion from the link driven in synchronism with the first piston being operatively connected to the combining lever associated with the oscillating member driven by the second piston, and the other radius rod which receives motion from the link driven in synchronism with the second piston being operatively connected to the combining lever associated with the oscillating member driven by the first piston, the oscillating member for one side of the mechanism being substantially coplanar with a link driven by the oscillating member for the other side of the mechanism.

16. In a reversible locomotive engine or the like having a pair of double-acting cylinders with their pistons and other reciprocating parts actuating cranks set at relatively different angular positions and steam-controlling valve means for each of said cylinders, a valve motion mechanism, adapted to combine the movements of both said pistons for actuating said valve means, comprising: a movably mounted member connected with a reciprocating part driven by one of said pistons for oscillation in synchronism with said piston, a movably mounted member connected with a reciprocating part driven by the second piston for oscillation in synchronism therewith, a pair of links respectively connected wth said members for oscillation thereby, a pair of combining levers pivotally mounted respectively on said oscillating members, each of said levers being connected respectively to operate the valve means associated with that cylinder whose piston is driving the respective oscillating member on which said lever is mounted, and a pair of radius rods adjustably coupled respectively with said links, the radius rod which receives motion from the link driven in synchronism with the first piston being operatively connected to the combining lever, associated with the oscillating member driven by the second piston, and the other radius rod which receives motion from the link driven in synchronism with the second piston being operatively connected to the combining lever associated with the oscillating member driven by the first piston, the major parts of the valve motion proper being arranged approximately in two side-by-side parallel planes, there being an oscillating member, a link and radius rod, and combining lever located substantially in one of said planes and a similar set of parts located substantially in the other of said planes.

17. In a reversible locomotive engine or the like having a pair of double-acting cylinders with their pistons and other reciprocating parts actuating cranks set at relatively different angular positions and steam-controlling valve means for each of said cylinders, a valve motion mechanism, adapted to combine the movements of both said pistons for actuating said valve means, comprising: a movably mounted member connected with a reciprocating part driven by one of said pistons for oscillation in synchronism with said piston, a movably mounted member connected with a reciprocating part driven by the second piston for oscillation in synchronism therewith, a pair of links respectively connected with said members for oscillation thereby, a pair of combining levers pivotally mounted respectively on said oscillating members, each of said levers being connected respectively to operate the valve means associated with that cylinder whose piston is driving the respective oscillating member on which said lever is mounted, and a pair of radius rods adjustably coupled respectively with said links, the radius rod which receives motion motion from the link driven in synchronism with the first piston being operatively connected to the combining lever associated with the oscillating member driven by the second piston, and the other radius rod which receives motion from the link driven in synchronism with the second piston being operatively connected to the combining lever associated with the oscillating member driven by the first piston, the major parts of the valve motion proper being arranged approximately in two side-by-side parallel planes, there being an oscillating member, a link and radius rod, and combining lever located substantially in one of said planes and a similar set of parts located substantially in the other of said planes, the driving connections from the oscillating members to the links being crossed, substantially from one plane to the other.

18. In a reversible locomotive engine or the like having a pair of double-acting cylinders with their pistons and other reciprocating parts actuating cranks set at relatively different angular positions and steam-controlling valve means for each of said cylinders, a valve motion mechanism, adapted to combine the movements of both said pistons for actuating said valve means, comprising: a movably mounted member connected with a reciprocating part driven by one of said pistons for oscillation in synchronism with said piston, a movably mounted member connected with a reciprocating part driven by the second piston for oscillation in synchronism therewith, a pair of links respectively connected with said members for oscillation thereby, a pair of combining levers pivotally mounted respectively on said oscillating members, each of said levers being connected respectively to operate the valve means associated with that cylinder whose piston is driving the respective oscillating member on which said lever is mounted, and a pair of radius rods adjustably coupled respectively with said links, the radius rod which receives motion from the link driven in synchronism with the first piston being operatively connected to the combining lever associated with the oscillating member driven by the second piston, and the other radius rod which receives motion from the link driven in synchronism with the second piston being operatively connected to the combining lever associated with the oscillating member driven by the first piston, the major parts of the valve motion proper being arranged approximately in two side-by-side parallel planes, there being an oscillating member, a link and radius rod, and combining lever located substantially in one of said planes and a similar set of parts located substantially in the other of said planes, the driving connections from the oscillating members to the links being crossed substantially from one plane to the other, the cross-connections between the oscillating members and the link members being both coupled to one pair of said members at the same side of their oscillating centers and to the other pair of said members at opposite sides of their oscillating centers.

19. For a locomotive engine having cylinders, pistons reciprocable therein, and steam valve mechanism, a valve gear comprising an oscillating member driven in synchronism with the piston on one side of the engine, a link in the same plane with said oscillating member and actuated from a similar oscillating member driven in synchronism with the piston on the opposite side, and a combining lever associated with said first mentioned oscillating member and coupled also with said link to combine the motions of both pistons, and having connection means for delivering the combined motion to the valve means on the first mentioned side.

20. For a locomotive having two cylinders with their valve chests, a valve gear for actuating the valves of both cylinders including mechanism for combining a plurality of motions and varying the combination of motions and arranged as a compact unit intermediate the axes of the two cylinders, and a casing housing most of the valve gear including said mechanism and serving as a frame therefor, and removably mounted in fixed relation to the valve chests.

21. In a locomotive having cylinders and valve means therefor, variable cut-off valve gear having mechanism combining motions derived from parts driven by the cylinders at both sides and connected to operate the valve means on one side, and having similar mechanism connected to operate the valve means on the other side, said mechanisms being located adjacent to each other in a zone intermediate the axes of the two cylinders, and a common case enclosing said mechanisms.

22. In a locomotive having cylinders and valve means therefor, variable cut-off valve gear having mechanism combining motions derived from parts driven by the cylinders at both sides and connected to operate the valve means on one side, and having similar mechanism connected to operate the valve means on the other side, said mechanisms being located adjacent to each other in a zone intermediate the axes of the two cylinders, and a common oil tight case enclosing both of said mechanisms, the means of connection to the valve means comprising rock shafts extending through the walls of said case.

23. In combination with the valve chests and crossheads of a locomotive engine, a reversible, variable cut-off valve motion mechanism located between the valve chests adjacent the longitudinal midplane of the locomotive and including a pair of transverse rock-shafts the motions of which are combined by said valve motion mechanism, said rockshafts having portions extending laterally outwardly to points adjacent the respective planes of motion of the crossheads, an arm fixed on each of said shafts and coupled to the adjacent crosshead whereby said shafts are oscillated in synchronism respectively with said crossheads, a pair of oscillating shafts driven by the valve motion mechanism and having portions extending laterally outwardly one at each side to a region close to the longitudinal plane of the adjacent valve chest, an arm fixed on each of said oscillating shafts, and means coupling each of the later arms to the valve mechanism in the respective valve chest.

24. In combination with the valve chests and crossheads of a locomotive engine, a reversible, variable cut-off valve motion mechanism located between the valve chests adjacent the longitudinal midplane of the locomotive and including a pair of transverse rockshafts the motions of which are combined by said valve motion mechanism, said rockshafts having portions extending laterally outwardly to points adjacent the respective planes of motion of the crossheads, an arm fixed on each of said shafts and coupled to the adjacent crosshead whereby said shafts are oscillated in synchronism respectively with said crossheads, a pair of oscillating shafts driven by the valve motion mechanism and having portions extending laterally outwardly one at each side to a region close to the longitudinal plane of the adjacent valve chest, an arm fixed on each of said oscillating shafts, and means coupling each of the latter arms to the valve mechanism in the respective valve chest, and a common housing enclosing the said valve motion mechanism, said rockshafts and oscillating shafts extending through the side walls of said housing.

25. In combination with the cylinder saddle, valve chests and crossheads of a locomotive engine, a reversible, variable cut-off valve motion mechanism located between the valve chests adjacent the longitudinal midplane of the locomotive and including a pair of transverse rockshafts the motions of which are combined by said valve motion mechanism, said rockshafts having portions extending laterally outwardly to points adjacent the respective planes of motion of the crossheads, an arm fixed on each of said shafts and coupled to the adjacent crosshead whereby said shafts are oscillated in synchronism respectively with said crossheads, a pair of oscillating shafts driven by the valve motion mechanism and having portions extending laterally outwardly one at each side to a region close to the longitudinal plane of the adjacent valve chest, an arm fixed on each of said oscillating shafts, and means coupling each of the latter arms to the valve mechanism in the respective valve chest, and a frame supporting the valve motion mechanism proper and removably mounted at the rear of the cylinder saddle for removal and replacement of the valve motion mechanism as a unit.

26. In combination with the cylinders, valves and crossheads of a locomotive engine, a reversible, variable cut-off valve motion mechanism adapted to combine the motions of both crossheads for actuating the valves of both cylinders, comprising rockshafts extending transversely from adjacent the sides of the locomotive to an intermediate region thereof and coupled at their outer ends respectively to the two crossheads, similar oscillating shafts extending from said intermediate region transversely outwardly and at their outer ends coupled respectively to the valves at the two sides of the locomotive, and adjustable mechanism located in said intermediate region and connected to receive and combine the motions of said rockshafts and deliver the combined movement to said oscillating shafts, all said shafts which extend to and from the central mechanism at one side thereof terminating short of the corresponding shafts at the other side, and the combining mechanism comprising a pair of diagonally crossed reciprocating driving rods which constitute the means for transferring motion from the right and left crossheads to the left and right portions respectively of the mechanism.

27. In combination with the cylinders, valves and crossheads of a locomotive engine, a reversible, variable cut-off valve motion mechanism adapted to combine the motions of both crossheads for actuating the valves of both cylinders comprising rockshafts extending transversely from adjacent the sides of the locomotive to an intermediate region thereof and coupled at their outer ends respectively to the two cross-heads, similar oscillating shafts extending from said intermediate region transversely outwardly and at their outer ends coupled respectively to the valves at the two sides of the locomotive, and adjustable mechanism located in said intermediate region and connected to receive and combine the motions of said rockshafts and deliver the combined movement to said oscillating shafts, all said shafts which extend to and from the central mechanism at one side thereof terminating short of the corresponding shafts at the other side, and the combining mechanism comprising a pair of diagonally crossed reciprocating driving rods which constitute the means for transferring motion from the right and left crossheads to the left and right portions respectively of the mechanism, and a transverse reversing shaft coupled at one end to the reverse reach rod and connected to both the right and left adjustable parts of said central mechanism for adjusting the same in unison in the same direction.

28. In a locomotive having at each side a cylinder and valve means therefor, valve motion work for the valve means of the two cylinders comprising mechanism adapted to variably combine motions derived from parts driven by the two cylinders and deliver the combined motions to the valve means of the two cylinders, the motion work, including said mechanism, being for the most part located in a region between the vertical longitudinal planes of the two cylinders, with casing means enclosing the same, there being driving, driven and adjusting connections extending to and from said motion work and including rockshafts which pass through walls of the casing means.

29. For a locomotive engine or the like having at each side, outside the planes of the driving wheels, a cylinder, valve means therefor, and a piston therein with parts actuated by said piston, a valve gear for the valve means of the two cylinders comprising: at the two sides of the engine, actuating connections coupled to said moving parts, mounted to oscillate in unison with the respective pistons and extending laterally inwardly to and terminating in a region intermediate the cylinders and between the planes of the locomotive wheels; mechanism located in said intermediate region for variably combining the motions of said actuating connections from the two sides, said mechanism being arranged as a compact unit in said intermediate region; and valve actuating linkages extending from said mechanism to the respective valve means of the two cylinders to actuate them in timed relation, respectively, to the reciprocation of the pistons in the associated cylinders.

30. For a locomotive engine or the like having at each side, outside the planes of the driving wheels, a cylinder, valve means therefor, a reciprocating piston therein, and moving parts actuated by said piston, a valve gear comprising: at each side of the engine, a single actuating connection coupled to one of said moving parts, mounted to oscillate in unison with the respective piston on that side, and extending laterally inwardly to a central region intermediate the cylinders and between the planes of the locomotive wheels; mechanism located in said intermediate region for variably combining the motions of said two actuating connections, and comprising a pair of combining levers each receiving a predetermined component of motion from one of said oscillating connections and a variable component of motion from the other; and valve actuating linkages extending from the individual combining levers to the respective valve means of the two cylinders to actuate them in timed relation, respectively, to the reciprocation of the pistons in the associated cylinders.

31. For a locomotive engine or the like having a pair of cylinders, valve means therefor, a reciprocating piston in each cylinder and moving parts actuated by said pistons, a valve gear comprising: at each side of the engine, an actuating connection coupled to one of said moving parts and driving a transmission lever to oscillate the latter in unison with the respective piston, the two transmission levers being mounted to oscillate on coaxial centers; a pair of swinging links or quadrants mounted to oscillate on coaxial centers spaced from the centers first mentioned; cross connections driving the respective swinging links each from the transmission lever on the opposite side; for each side a combining lever pivotally mounted at a predetermined point on the transmission lever on the respective side; for each side a radius rod coupled to the combining lever on that side and to the swinging link driven from the opposite side; and means coupling the respective combining levers to the valve means on the corresponding sides to actuate them in timed relation to the reciprocation of the pistons in the associated cylinders.

32. In combination with the cylinders, valves and crossheads of a locomotive engine, a reversible, variable cut-off valve motion mechanism adapted to combine the motions of both crossheads for actuating the valves of both cylinders, comprising rockshafts extending transversely from adjacent the sides of the locomotive to an intermediate region thereof and coupled at their outer ends respectively to the two crossheads, similar oscillating shafts extending from said intermediate region transversely outwardly and at their outer ends coupled respectively to the valves at the two sides of the locomotive, and adjustable mechanism located in said intermediate region and connected to receive and combine the motions of said rockshafts and deliver the combined movement to said oscillating shafts, all said shafts which extend to and from the central mechanism at one side thereof terminating short of the corresponding shafts at the other side, and said combining mechanism including cross-over connections for transferring motion from the right and left rockshafts to the left and right portions respectively of the mechanism.

33. For a locomotive engine or the like having at each side, outside the planes of the driving wheels, a cylinder, valve means therefor, and a piston therein with parts actuated by said piston, a valve gear for the valve means of the two cylinders comprising: at the two sides of the engine, actuating connections coupled to said moving parts, mounted to oscillate in unison with the respective pistons and extending laterally inwardly to and terminating in a region intermediate the cylinders and between the planes of the locomotive wheels; mechanism located in said intermediate region for variably combining different motions of said actuating connections; housing means substantially enclosing said mechanism; and valve actuating linkages extending from said mechanism to the respective valve means of the two cylinders to actuate them in timed relation, respectively, to the reciprocation of the pistons in the associated cylinders.

WILLIAM E. WOODARD.

CERTIFICATE OF CORRECTION.

Patent No. 2,136,405. November 15, 1938.

WILLIAM E. WOODARD.

It is hereby certified that error appears in the printed specification of the above numbered patent requiring correction as follows: Page 2, second column, line 43, after "about" insert on; line 60, for the word "crossed" read crosshead; page 8, second column, line 25, claim 23, for "later" read latter; and that the said Letters Patent should be read with this correction therein that the same may conform to the record of the case in the Patent Office.

Signed and sealed this 27th day of December, A. D. 1938.

Henry Van Arsdale (Seal) Acting Commissioner of Patents.

from adjacent the sides of the locomotive to an intermediate region thereof and coupled at their outer ends respectively to the two crossheads, similar oscillating shafts extending from said intermediate region transversely outwardly and at their outer ends coupled respectively to the valves at the two sides of the locomotive, and adjustable mechanism located in said intermediate region and connected to receive and combine the motions of said rockshafts and deliver the combined movement to said oscillating shafts, all said shafts which extend to and from the central mechanism at one side thereof terminating short of the corresponding shafts at the other side, and said combining mechanism including cross-over connections for transferring motion from the right and left rockshafts to the left and right portions respectively of the mechanism.

33. For a locomotive engine or the like having at each side, outside the planes of the driving wheels, a cylinder, valve means therefor, and a piston therein with parts actuated by said piston, a valve gear for the valve means of the two cylinders comprising: at the two sides of the engine, actuating connections coupled to said moving parts, mounted to oscillate in unison with the respective pistons and extending laterally inwardly to and terminating in a region intermediate the cylinders and between the planes of the locomotive wheels; mechanism located in said intermediate region for variably combining different motions of said actuating connections; housing means substantially enclosing said mechanism; and valve actuating linkages extending from said mechanism to the respective valve means of the two cylinders to actuate them in timed relation, respectively, to the reciprocation of the pistons in the associated cylinders.

WILLIAM E. WOODARD.

CERTIFICATE OF CORRECTION.

Patent No. 2,136,405. November 15, 1938.

WILLIAM E. WOODARD.

It is hereby certified that error appears in the printed specification of the above numbered patent requiring correction as follows: Page 2, second column, line 43, after "about" insert on; line 60, for the word "crossed" read crosshead; page 8, second column, line 25, claim 23, for "later" read latter; and that the said Letters Patent should be read with this correction therein that the same may conform to the record of the case in the Patent Office.

Signed and sealed this 27th day of December, A. D. 1938.

Henry Van Arsdale (Seal)

Acting Commissioner of Patents.